United States Patent
Gu et al.

(10) Patent No.: US 10,756,569 B2
(45) Date of Patent: Aug. 25, 2020

(54) DECENTRALIZED VOLTAGE CONTROL METHOD FOR MICROGRID BASED ON NONLINEAR STATE OBSERVERS

(71) Applicant: SOUTHEAST UNIVERSITY, Nanjing (CN)

(72) Inventors: Wei Gu, Nanjing (CN); Guannan Lou, Nanjing (CN); Suyang Zhou, Nanjing (CN); Zhi Wu, Nanjing (CN); Ge Cao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 101 days.

(21) Appl. No.: 16/107,932

(22) Filed: Aug. 21, 2018

(65) Prior Publication Data
US 2018/0358840 A1 Dec. 13, 2018

Related U.S. Application Data

(63) Continuation-in-part of application No. PCT/CN2017/119850, filed on Dec. 29, 2017.

Foreign Application Priority Data

Dec. 30, 2016 (CN) .......................... 2016 1 1269647

(51) Int. Cl.
*H02J 13/00* (2006.01)
*H02J 3/38* (2006.01)
(Continued)

(52) U.S. Cl.
CPC .......... *H02J 13/0013* (2013.01); *G05B 17/02* (2013.01); *H02J 3/12* (2013.01);
(Continued)

(58) Field of Classification Search
CPC .......... H02J 13/0013; H02J 3/12; H02J 3/881; H02J 2003/007; G05B 17/02; H02M 1/44; H02M 7/217; Y02P 80/14
See application file for complete search history.

(56) References Cited

U.S. PATENT DOCUMENTS

| | | | |
|---|---|---|---|
| 8,965,588 B2* | 2/2015 | Milosevic | H02J 3/12 700/286 |
| 2010/0185336 A1* | 7/2010 | Rovnyak | H02J 3/38 700/287 |
| 2016/0094149 A1* | 3/2016 | Pahlevaninezhad | H02M 1/126 363/97 |

OTHER PUBLICATIONS

Dehkordi, Nima Mandian, et al. "Fully Distributed Cooperative Secondary Frequency and Voltage Control of Islanded Microgrids." IEEE Transactions on Energy Conversion , vol. 32, No. 2, Dec. 13, 2016, pp. 675-685 (Year: 2016).*

(Continued)

*Primary Examiner* — Chad G Erdman
(74) *Attorney, Agent, or Firm* — CBM Patent Consulting, LLC

(57) ABSTRACT

A decentralized voltage control method for a microgrid based on nonlinear state observers, comprising the steps of step 10), establishing a large-signal model of distributed generations, a connection network and impedance-type loads in the microgrid; step 20), establishing a Luenberger-like nonlinear state observer for each distributed generation; step 30), estimating the dynamic characteristics of other distributed generations in real time based on the local measured values of each distributed generation; and step 40), implementing the decentralized voltage control based on the control requirements of reactive power sharing and voltage restoration. The control method realizes the voltage control of microgrid based on the decentralized state observers, which does not rely on communication transmission or (Continued)

remote measurement and avoids the adverse effects of communication latency and data drop-out on the control performance.

5 Claims, 8 Drawing Sheets

(51) Int. Cl.
    *H02M 7/217*     (2006.01)
    *H02J 3/12*     (2006.01)
    *G05B 17/02*     (2006.01)
    *H02M 1/44*     (2007.01)

(52) U.S. Cl.
    CPC ............... *H02J 3/381* (2013.01); *H02M 1/44* (2013.01); *H02M 7/217* (2013.01); *H02J 2203/20* (2020.01); *Y02P 80/14* (2015.11)

(56) References Cited

OTHER PUBLICATIONS

Wang, Chengshan, et al. "A Nonlinear-Disturbance-Observer-Based DC-Bus Voltage Control for a Hybrid AC/DC Microgrid." IEEE Transactions on Power Electronics, vol. 29, No. 11, Jun. 11, 2014, pp. 6162-6177 (Year: 2014).*

Kabalan, Mahmoud, et al."Large Signal Lyapunov-Based Stability Studies in Microgrids: A Review." IEEE Transactions on Smart Grid, vol. 8, No. 5, Feb. 11, 2016, p. 2287-2295 (Year: 2016).*

Lu, Xiaonan, et al. "DC Microgrids—Part I: A Review of Control Strategies and Stabilization Techniques." IEEE Transactions on Power Electronics, vol. 31, No. 7, Sep. 15, 2015, p. 4876-91 (Year: 2015).*

Benigni. A. et al. "A Decentralized Observer for Electrical Power Systems: Implementation and Experimental Validation." 2008 IEEE Instrumentation and Measurement Technology Conference, May 12-15, 2008 (Year: 2008).*

\* cited by examiner

US 10,756,569 B2

DECENTRALIZED VOLTAGE CONTROL METHOD FOR MICROGRID BASED ON NONLINEAR STATE OBSERVERS

This application is the continuation-in-part of of International Application No. PCT/CN2017/119850 filed on 29 Dec. 2017 Filed on which designated the U.S. and claims priority to Chinese Application No. CN201611269647.X filed 30 Dec. 2016, the entire contents of each of which are hereby incorporated by reference.

TECHNICAL FIELD

The present invention belongs to the field of microgrid operation control, and specifically, relates to a decentralized voltage control method for a microgrid based on nonlinear state observers.

BACKGROUND ART

With the gradual exhaustion of earth resources and the increase of people's attention to environmental issues, the application of renewable energy resources is increasingly valued by countries around the world. The microgrid is an emerging energy organization mode that increases the permeability of renewable energy resources to provide uninterrupted power supply. The microgrid includes different types of distributed energy resources (DERs, including micro gas turbines, wind driven generators, photovoltaics, fuel cells, energy storages, etc.), user terminals of various electrical loads and/or thermal loads and related monitoring and protection devices.

The internal power supply of the microgrid mainly lies in the energy conversion by power electronic devices, where proper control is indispensable. With respect to the main grid, the microgrid can be considered as a controlled power unit, and meets the requirement of power quality and power supply security. The microgrid is connected to the main grid through the point of common coupling for energy exchange, and the both parties are mutually standby, which improves the reliability of power supplies. Since the microgrid is a small-scale power system and close to the load, it can greatly increase the reliability of power supplies, reduce the network loss and greatly enhance the energy efficiency, which meets the requirements of future development in smart grid.

Droop control algorithm is widely concerned because of the realization of communication-free power sharing, but the output voltage of each distributed generation may suffer from the steady-state deviation. At the same time, voltage droop control typically yields towards a poor performance in the reactive power sharing due to the difference in the output impedance of each distributed generation. Therefore, secondary voltage control is needed to improve the accuracy of reactive power sharing and the voltage performance in the microgrid system. The cooperative voltage control schemes have already undertaken, regarding centralized control and distributed control, both of which rely on communication technologies, However, the communication process is usually affected by information latency and data drop-out, and in the worst case the system stability is affected. Therefore, it is necessary to investigate a decentralized control system that does not rely on remote measurements or real-time communications to carry out reactive power sharing and voltage restoration of distributed generations, thereby improving the stability and dynamic performance of the microgrid and improving the power quality.

SUMMARY OF THE INVENTION

Technical problem: The technical problem to be solved by the present invention is: providing a decentralized voltage control method for a microgrid based on nonlinear state observers, in which the state observer of each distributed generation estimates the output voltages and reactive power values of other distributed generations in real time, and the secondary voltage control is started to achieve accurate reactive power sharing and average voltage restoration of the microgrid, thereby improving the stability and the performance of the microgrid.

Technical scheme: In order to solve the above technical problem, an embodiment of the present invention provides a decentralized voltage control method for a microgrid based on nonlinear state observers, including the following steps:

step 10), Suppose that there are N distributed generations in a microgrid. After scanning the connection/disconnection statuses of all DG (Distributed Generation) units and loads, and querying the corresponding parameters, establish, a large-signal model of microgrid, with distributed generations, a connection network and impedance-type loads each distributed generation employs the droop control to generate the output voltage and frequency reference for individual inverters as shown in formula (1):

$$\begin{cases} \omega_i = \omega_n - m_{Pi} P_i \\ k_{Vi} \dot{V}_{o,magi} = V_n - V_{o,magi} - n_{Qi} Q_i \end{cases} \quad \text{formula (1)}$$

in formula (1), $\omega_i$ denotes the local angular frequency of the $i^{th}$ distributed generation; $\omega_n$ denotes the local angular frequency reference value of the distributed generation: rad/s; $m_{Pi}$ denotes the frequency droop characteristic coefficient of the $i^{th}$ distributed generation: rad/s; $P_i$ denotes the actual output active power of the $i^{th}$ distributed generation: W; $k_{Vi}$ denotes the droop control gain of the $i^{th}$ distributed generation; $\dot{V}_{o,magi}$ denotes the change rate of the output voltage of the it distributed generation: V/S; $V_n$ denotes the output voltage reference value of the distributed generation: V; $V_{o,magi}$ denotes the output voltage of the $i^{th}$ distributed generation: V; $n_{Qi}$ denotes the voltage droop characteristic coefficient of the $i^{th}$ distributed generation: V/Var; $Q_i$ denotes the actual output reactive power of the $i^{th}$ distributed generation: Var;

the actual output active power $P_i$ and reactive power $Q_i$ of the $i^{th}$ distributed generation are obtained through a low-pass filter, as shown in formula (2):

$$\begin{cases} \dot{P}_i = -\omega_{ci} P_i + \omega_{ci}(V_{odi} i_{odi} + V_{oqi} i_{oqi}) \\ \dot{Q}_i = -\omega_{ci} Q_i + \omega_{ci}(V_{oqi} i_{odi} - V_{odi} i_{oqi}) \end{cases} \quad \text{formula (2)}$$

in formula (2), $\dot{P}_i$ denotes the change rate of active power of the $i^{th}$ distributed generation: W/S; $\omega_{ci}$ denotes the low-pass filter cutoff frequency of the $i^{th}$ distributed generation: rad/s; $V_{odi}$ denotes the d-axis component of the output voltage of the $i^{th}$ distributed generation in the dq reference coordinate of the $i^{th}$ distributed generation: V; $V_{oqi}$ denotes the q-axis component of the output voltage of the $i^{th}$ distributed generation in the dq reference coordinate of the $i^{th}$ distributed generation: V; $i_{odi}$ denotes the d-axis component of the output current of the $i^{th}$ distributed generation in the dq reference coordinate of the $i^{th}$ distributed generation: A;

$i_{oqi}$ denotes the q-axis component of the output current of the $i^{th}$ distributed generation in the dq reference coordinate of the $i^{th}$ distributed generation: A; $\dot{Q}_i$ denotes the change rate of reactive power of the $i^{th}$ distributed generation: Var/S;

As the primary voltage control for each distributed generation enables the voltage magnitude on the q axis as zero, the secondary voltage control can be further obtained as formula (3)

$$\begin{cases} k_{Vi}\dot{V}_{odi} = V_{ni} - V_{odi} - n_{Qi}Q_i + u_i \\ V_{oqi} = 0 \end{cases} \quad \text{formula (3)}$$

in formula (3), $\dot{V}_{odi}$ denotes the change rate of the d-axis component of the output voltage of the $i^{th}$ distributed generation in the dq reference coordinate of the $i^{th}$ distributed generation: V/S; $V_{ni}$ denotes the output voltage reference value of the $i^{th}$ distributed generation, and $u_i$ denotes the secondary voltage control input: V;

the dynamic equation of the output current of the distributed generation is as shown in formula (4):

$$\begin{cases} \dot{i}_{odi} = -\frac{R_{ci}}{L_{ci}}i_{odi} + \omega_i i_{oqi} + \frac{1}{L_{ci}}(V_{odi} - V_{busdi}) \\ \dot{i}_{oqi} = -\frac{R_{ci}}{L_{ci}}i_{oqi} - \omega_i i_{odi} + \frac{1}{L_{ci}}(V_{oqi} - V_{busqi}) \end{cases} \quad \text{formula (4)}$$

in formula (4), $\dot{i}_{odi}$ denotes the change rate of the d-axis component of the output current of the $i^{th}$ distributed generation in the dq reference coordinate of the $i^{th}$ distributed generation: A/S; $R_{ci}$ denotes the connection resistance from the $i^{th}$ distributed generation to the bus i: Ω; $L_{ci}$ denotes the connection inductance from the $i^{th}$ distributed generation to the bus i: H; $V_{busdi}$ denotes the d-axis component of the voltage of the bus i in the dq reference coordinate of the $i^{th}$ distributed generation; $\dot{i}_{oqi}$ denotes the change rate of the q-axis component of the output current of the $i^{th}$ distributed generation in the dq reference coordinate of the $i^{th}$ distributed generation: A/S; $V_{busqi}$ denotes the q-axis component of the voltage of the bus i in the dq reference coordinate of the $i^{th}$ distributed generation: V;

according to formulas (1) to (4), a dynamic equation of the $i^{th}$ distributed generation is obtained, as shown in formula (5):

$$\begin{cases} \dot{x}_{invi} = f_{invi}(x_{invi}) + k_{invi}(x_{invi})V_{busDQi} + h_{invi}\omega_{com} + g_{invi}u_i \\ i_{oDQi} = C_{invci}x_{invi} \end{cases} \quad \text{formula (5)}$$

in the formula, $\dot{x}_{invi}$ denotes the change rate of the state variable of the $i^{th}$ distributed generation, $\dot{x}_{invi}=[\dot{\delta}_i, \dot{P}_i, \dot{Q}_i, \dot{V}_{odi}, \dot{i}_{odi}, \dot{i}_{oqi}]^T$; $\dot{\delta}$ denotes the change rate of $\delta_i$; $x_{invi}$ denotes the state variable of the $i^{th}$ distributed generation, $x_{invi}=[\delta_i, P_i, Q_i, V_{odi}, i_{odi}, i_{oqi}]^T$; wherein $\delta_i$ denotes the phase angle difference between the dq axis of the dq reference coordinate of the $i^{th}$ distributed generation and the DQ axis in the common reference coordinate DQ of the microgrid: rad; $f_{invi}(x_{invi})$ denotes a state function of the $i^{th}$ distributed generation, and $k_{invi}(x_{invi})$ denotes a voltage disturbance function of the bus i; $V_{busDQi}=[V_{busDi}, V_{busQi}]^T$, and $V_{busDi}$ denotes the D-axis component of the bus i in the common reference coordinate DQ: V; $V_{busQi}$ denotes the Q-axis component of the bus i in the common reference coordinate DQ: V; $\omega_{com}$ denotes the angular frequency of the common reference coordinate: rad/s; $h_{invi}$ denotes a connection matrix of the angular frequency of the common reference coordinate; $g_{invi}$ denotes an input matrix of the it distributed generation; $i_{oDQi}=[i_{oDi}, i_{oQi}]^T$, $i_{oDi}$ denotes the D-axis component of the output current of the $i^{th}$ distributed generation in the common reference coordinate DQ, and $i_{oQi}$ denotes the Q-axis component of the output current of the $i^{th}$ distributed generation in the common reference coordinate DQ: A; $C_{invi}$ denotes an output matrix of the $i^{th}$ distributed generation;

a current dynamic equation of the $i^{th}$ line between the bus i and the bus j is as shown in formula (6):

$$\begin{cases} \dot{i}_{lineDi} = -\frac{r_{linei}}{L_{linei}}i_{lineDi} + \omega_{com}i_{lineQi} + \frac{1}{L_{linei}}(V_{busDi} - V_{busDj}) \\ \dot{i}_{lineQi} = -\frac{r_{linei}}{L_{linei}}i_{lineQi} - \omega_{com}i_{lineDi} + \frac{1}{L_{linei}}(V_{busQi} - V_{busQj}) \end{cases} \quad \text{formula (6)}$$

in the formula, $\dot{i}_{lineDi}$ denotes the change rate of the D-axis component of the current of the $i^{th}$ line in the common reference coordinate DQ: A/S; $r_{linei}$ denotes the line resistance of the $i^{th}$ line: Ω; $L_{linei}$ denotes the line inductance of the $i^{th}$ line: H; $i_{lineDi}$ denotes the D-axis component of the current of the $i^{th}$ line in the common reference coordinate DQ, and $i_{lineQi}$ denotes the Q-axis component of the current of the it line in the common reference coordinate DQ: A; $V_{busDi}$ denotes the D-axis component of the bus i in the common reference coordinate DQ, $V_{busDj}$ denotes the D-axis component of the bus j in the common reference coordinate DQ, and $\dot{i}_{lineQi}$ denotes the change rate of the Q-axis component of the current of the it line in the common reference coordinate DQ: A/S; $V_{busQi}$ denotes the Q-axis component of the bus i in the common reference coordinate DQ: V; $V_{busQj}$ denotes the Q-axis component of the bus j in the common reference coordinate DQ: V;

a current dynamic equation of the $j^{th}$ load connected to the bus j is as shown in formula (7):

$$\begin{cases} \dot{i}_{loadDj} = -\frac{R_{loadj}}{L_{loadj}}i_{loadDj} + \omega_{com}i_{loadQj} + \frac{1}{L_{loadj}}V_{busDj} \\ \dot{i}_{loadQj} = -\frac{R_{loadj}}{L_{loadj}}i_{loadQj} - \omega_{com}i_{loadDj} + \frac{1}{L_{loadj}}V_{busQj} \end{cases} \quad \text{formula (7)}$$

in the formula, $\dot{i}_{loadDj}$ denotes the change rate of the D-axis component of the current of the $j^{th}$ load in the common reference coordinate DQ: A/S; $R_{loadj}$ denotes the load resistance of the $j^{th}$ load: S; $L_{loadj}$ denotes the load inductance of the $j^{th}$ load: H; $i_{loadDj}$ denotes the D-axis component of the current of the $j^{th}$ load in the common reference coordinate DQ, and $i_{loadQj}$ denotes the Q-axis component of the current of the $j^{th}$ load in the common reference coordinate DQ: A; and $\dot{i}_{loadQj}$ denotes the change rate of the Q-axis component of the current of the $j^{th}$ load in the common reference coordinate DQ: A/S;

according to formulas (5)-(7), the large-signal model of microgrid including n distributed generations, s buses and p loads is as shown in formula (8):

$$\begin{cases} \dot{x} = f(x) + gu \\ y_i = h_i(x) \end{cases} \quad \text{formula (8)}$$

wherein, $x=[x_{inv1}, \ldots, x_{invn}, i_{lineDQ1}, \ldots, i_{lineDQs}, i_{loadDQ1}, \ldots, i_{loadDQp}]^T$, $x_{inv1}$ denotes the state variable of the 1$^{st}$ distributed generation, $x_{invn}$ denotes the state variable of the n$^{th}$ distributed generation, $i_{lineDQ1}=[i_{lineD1}, i_{lineQ1}]^T$, $i_{lineD1}$ denotes the D-axis component of the current of the 1$^{st}$ line in the common reference coordinate DQ, $i_{lineQ1}$ denotes the Q-axis component of the current of the 1$^{st}$ line in the common reference coordinate DQ, $i_{lineDQs}=[i_{lineDs}, i_{lineQs}]^T$, $i_{lineDs}$ denotes the D-axis component of the current of the s$^{th}$ line in the common reference coordinate DQ, $i_{lineQs}$ denotes the Q-axis component of the current of the s$^{th}$ line in the common reference coordinate DQ, $i_{loadDQ1}=[i_{loadD1}, i_{loadQ1}]^T$, $i_{loadD1}$ denotes the D-axis component of the current of the 1$^{st}$ load in the common reference coordinate DQ, $i_{loadQ1}$ denotes the Q-axis component of the current of the 1$^{st}$ load in the common reference coordinate DQ, $i_{loadDQp}=[i_{loadDp}, i_{loadQp}]^T$, $i_{loadDp}$ denotes the D-axis component of the current of the p$^{th}$ load in the common reference coordinate DQ, and $i_{loadQp}$ denotes the Q-axis component of the current of the p$^{th}$ load in the common reference coordinate DQ; $u=[u_1 \ldots u_n]^T$, $u_1$ denotes the secondary control quantity of the 1$^{st}$ distributed generation, and $u_n$ denotes the secondary control quantity of the n$^{th}$ distributed generation; f(x) denotes a state function of the microgrid; g denotes an input matrix, and $y_i$ denotes an output value of the i$^{th}$ distributed generation; and $h_i(x)$ denotes an output function of the i$^{th}$ distributed generation;

step 20), establish a Luenberger-like nonlinear state observer for each distributed generation in the DSP (Digital Signal Processor):

according to the microgrid large-signal model established in step 10), establish a local Luenberger nonlinear state observer for each distributed generation, as shown in formula (9):

$$\dot{\hat{x}}=f(\hat{x})+g\cdot u+L(h_i(\hat{x})-y_i) \quad \text{formula (9)}$$

in the formula, $\hat{x}$ denotes the estimated state values of the microgrid in formula (8), $\dot{\hat{x}}$ denotes the change rate of the estimated state values in the microgrid; f($\hat{x}$) denotes a connection matrix of the microgrid under the action of the estimated value; L denotes a Luenberger state observer matrix; $h_i(\hat{x})$ denotes an output function of the i$^{th}$ distributed generation corresponding to the estimated state value $\hat{x}$;

step 30), The data acquisition module of each distributed generation collects the output voltage $V_{odi}$ and output current $i_{odi}$ and $i_{oqi}$ from the local sensor, which are to be sent to the nonlinear state observer of respective DSP in step 20). Estimate the dynamic characteristics of output voltage and output power of other distributed generations in real time according to the local measured values of each distributed generation;

step 40), The microgrid voltage reference instruction is entered through a human-machine interface and sent out to each distributed generation via the 485 communication mode. Based on the local measured value of each distributed generation and the estimated measurement of other distributed generations, the decentralized secondary voltage control is implemented to satisfy the requirements of accurate reactive power sharing and voltage restoration. The resultant secondary voltage compensation term is transmitted to the PWM (Pulse Width Modulation) module of the local controller; the generated PWM pulse signal is sent to the drive and power amplifier unit to trigger the power electronic switching transistor:

the reactive power sharing indicates that the output reactive power of each distributed generation is allocated according to the power capacity, and the implementation process is as shown in formula (10):

$$\begin{cases} \delta Q_i = k_{PQ}(Q_i^* - Q_i) + k_{iQ}\int(Q_i^* - Q_i)dt \\ Q_i^* = \dfrac{1/n_{Qi}}{\sum_{j=1}^{n}1/n_{Qj}}\left(Q_i + \sum_{j=1,j\neq i}^{n}\hat{Q}_j\right) \end{cases} \quad \text{formula (10)}$$

in the formula, $\delta Q_i$ denotes a reactive power control signal for each calculation cycle; $k_{PQ}$ denotes a proportional coefficient in the reactive power proportional integral controller; $Q^*_i$ denotes the reactive power reference of the i$^{th}$ distributed generation; $k_{iQ}$ denotes an integral coefficient in the reactive power proportional integral controller; $n_{Qj}$ denotes a voltage droop coefficient of the j$^{th}$ distributed generation; $\hat{Q}_j$ denotes a reactive power estimation value of the j$^{th}$ distributed generation;

the voltage restoration indicates that the average value of the output voltages of the distributed generations through the microgrid is restored to the rated value, and the implementation process is as shown in formula (11):

$$\begin{cases} \delta V_i = k_{PE}(V^* - \overline{V}_i) + k_{iE}\int(V^* - \overline{V}_i)dt \\ \overline{V}_i = \left(V_{odi} + \sum_{j=1,j\neq i}^{n}\hat{V}_{odj}\right)/n \end{cases} \quad \text{formula (11)}$$

in the formula, $\delta V_i$ denotes an average voltage restoration control signal for each calculation cycle; $k_{PE}$ denotes a proportional coefficient in the average voltage controller; $V^*$ denotes a voltage rated value; $\overline{V}_i$ denotes an average value of output voltages of all the distributed generations as estimated from the i$^{th}$ distributed generation; $k_{iE}$ denotes an integral coefficient in the average voltage controller; V denotes an estimated value of the d-axis component of the output current of the j$^{th}$ distributed generation in the dq reference coordinate of the j$^{th}$ distributed generation;

by combining formulas (10) and (11), the secondary voltage control input for the i$^{th}$ distributed generation is as shown in formula (12):

$$u_i = \delta Q_i + \delta V_i \quad \text{formula (12).}$$

As a preferred embodiment, the common reference coordinate DQ refers to the dq reference coordinate of the 1$^{st}$ distributed generation, and the state variables of the remaining distributed generations, buses and loads are converted to the common reference coordinate DQ through coordinate transformation.

As a preferred embodiment, in step 10), the loads are impedance-type loads.

As a preferred embodiment, in step 10), the frequency droop coefficient $m_{Pi}$ is determined according to the active power capacity of each distributed generation; and the voltage droop coefficient $n_{Qi}$ is determined according to the reactive power capacity of each distributed generation.

As a preferred embodiment, in step 40), the decentralized voltage control of reactive power sharing and average voltage restoration is implemented based on the estimated value of each distributed generation on real-time states of other distributed generations, which does not rely on communication.

Beneficial effects: Compared with the prior literature, the present invention has the following beneficial effects: the control method according to the embodiments of the present invention is a decentralized voltage control method, which does not rely on remote measurements or communication lines, and the real-time states are estimated by a state observer to achieve reactive power sharing and average voltage restoration of each distributed generation, so that the system dynamics are improved. According to the decentralized voltage control method of a microgrid in the embodiments of the present invention, a Luenberger-like state observer is designed for each distributed generation according to the established microgrid large system model, and the output voltage and reactive power of other distributed generations are estimated by acquiring local output voltage and current data, so that the dependence of the conventional control method on a remote measurement and a communication technology is avoided. In addition, since the state observer is acquired based on the microgrid large-signal model rather than the small-signal linearization at some operation points, the microgrid voltage control according to the embodiments of the present invention adapts to a wide-range operation process, and steady-state operation points do not need to be known in advance, so the method is easy to implement. Compared with the existing methods, the method according to the embodiments of the present invention is not affected by communication latency or data drop-out, improves the stability and performance of the microgrid, and is beneficial for the accurate reactive power sharing and voltage restoration.

BRIEF DESCRIPTION OF THE DRAWINGS

FIG. 7($b$) is a control effect diagram of output reactive power throughout the microgrid adopting the conventional latency-free centralized control method;

FIG. 7($c$) is a control effect diagram of the output voltage of the microgrid adopting the conventional latency-free centralized control method;

FIG. 8($b$) is a control effect diagram of output reactive power of the microgrid adopting the control method according to an embodiment of the present invention;

FIG. 8($c$) is a control effect diagram of the output voltage of the microgrid adopting the control method according to an embodiment of the present invention;

FIG. 9($b$) is a control effect diagram of the output voltage of the microgrid adopting the conventional latent centralized control method.

DETAILED DESCRIPTION OF THE INVENTION

For the purpose of making the objects, the technical schemes and the advantages of the present invention clearer, the following contents describe the present invention in details in combination with the accompanying drawings and embodiments. It should be understood that the specific embodiments described herein are only used for interpreting the present invention, rather than limiting the present invention.

Figure 1:
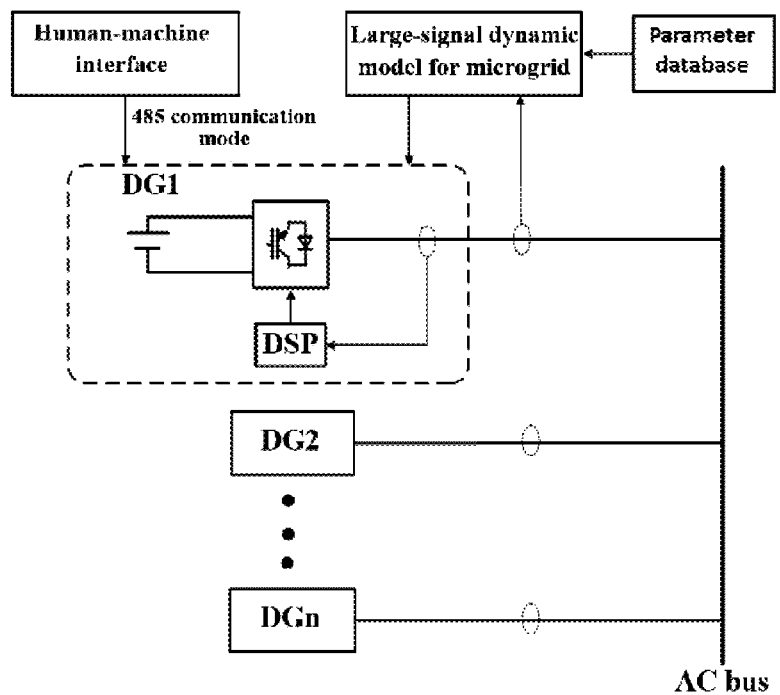
FIG. 1 is a structural diagram of parallel inverter microgrid of the present invention.
Figure 2:
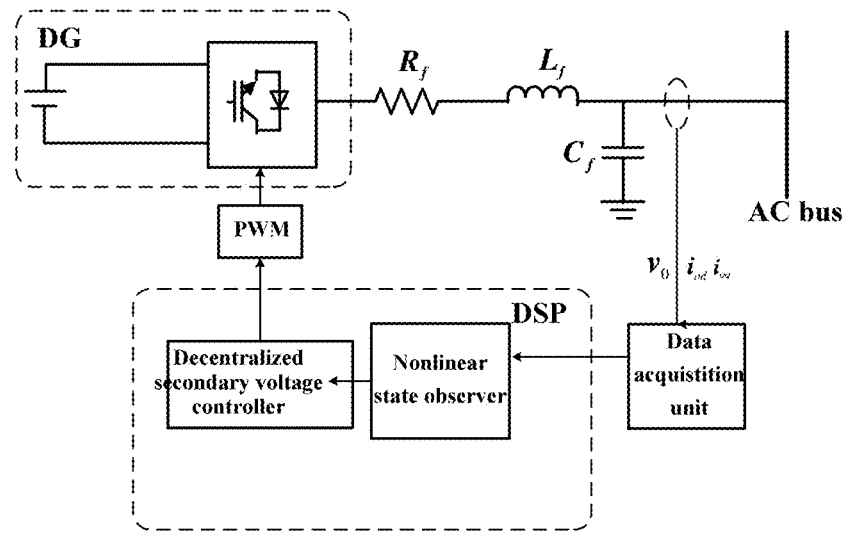
FIG. 2 is a detailed hardware implementation diagram of the present invention; Rf, Cf and Lf represent the resistance, inductance and capacitance of the filter of DG, respectively.
Figure 3:
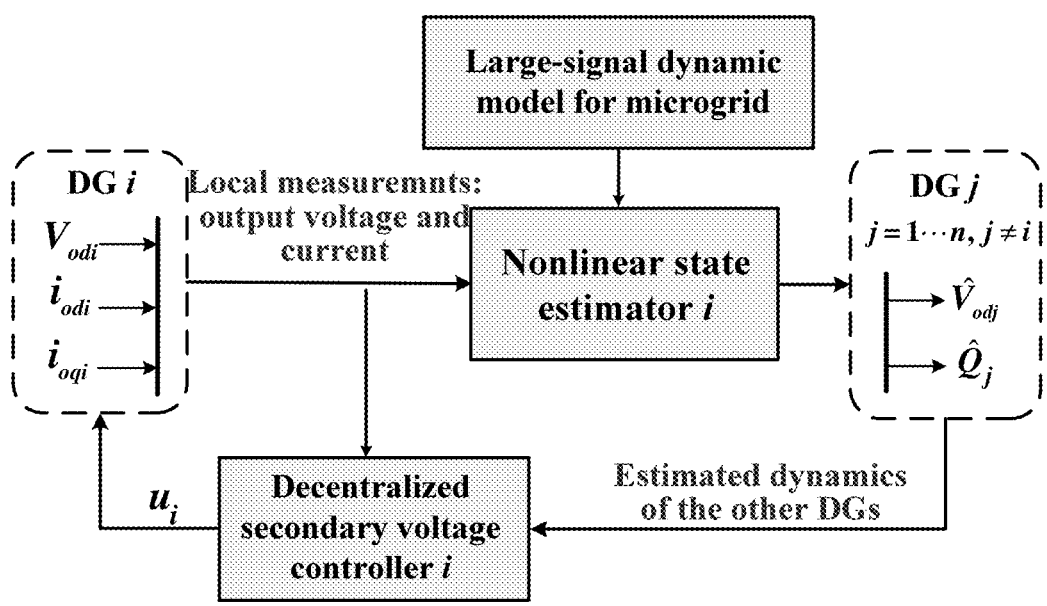
FIG. 3 is a flow diagram according to an embodiment of the present invention.

The control method of the present invention can be applied to a parallel inverter microgrid. As shown in FIG. 1, establish a large-signal microgrid model of distributed generations, a connection network and impedance-type loads after scanning the connection/disconnection statuses of all DG units and loads, and querying the corresponding parameters. The microgrid voltage reference instruction is entered through a human-machine interface and sent to each distributed generation via the 485 communication mode. The distributed generation performs the decentralized voltage control and the diagram of detailed hardware implementation is as shown in FIG. 2. The data acquisition unit of each distribution generation collects the output voltage and current from the local sensor, which are to be sent to the nonlinear state observer of respective DSP to estimate the output voltages and reactive powers of other distributed generations. Based on the local measurement of each distributed generation and the estimated measurement of other distributed generations, the decentralized voltage control is implemented and the voltage compensation instruction is generated and transmitted to the PWM module of the local controller to trigger the inverter operation. As shown in FIG. 3, a decentralized voltage control method for a microgrid based on nonlinear state observers according to an embodiment of the present invention includes the following steps:

Step 10), Suppose that there are N distributed generations in a microgrid. After scanning the connection/disconnection statuses of all DG units and loads, and querying the corresponding parameters, establish, a large-signal model of microgrid, with distributed generations, a connection network and impedance-type loads. Step 10) specifically includes:

each distributed generation employs the droop control to generate the output voltage and frequency reference for individual inverters, as shown in formula (1):

$$\begin{cases} \omega_i = \omega_n - m_{Pi} P_i \\ k_{Vi} \dot{V}_{o,magi} = V_n - V_{o,magi} - n_{Qi} Q_i \end{cases} \quad \text{formula (1)}$$

In formula (1), $\omega_i$ denotes the local angular frequency of the $i^{th}$ distributed generation; $\omega_n$ denotes the local angular frequency reference value of the distributed generation: rad/s; $m_{Pi}$ denotes the frequency droop characteristic coefficient of the $i^{th}$ distributed generation: rad/s; $P_i$ denotes the actual output active power of the $i^{th}$ distributed generation: W; $k_{Vi}$ denotes the droop control gain of the $i^{th}$ distributed generation; $\dot{V}_{o,magi}$ denotes the change rate of the output voltage of the $i^{th}$ distributed generation: V/S; $V_n$ denotes the output voltage reference value of the distributed generation: V; $V_{o,magi}$ denotes the output voltage of the $i^{th}$ distributed generation: V; $n_{Qi}$ denotes the voltage droop characteristic coefficient of the $i^{th}$ distributed generation: V/Var; and $Q_i$ denotes the actual output reactive power of the it distributed generation: Var.

The actual output active power $P_i$ and reactive power $Q_i$ of the $i^{th}$ distributed generation are obtained through a low-pass filter, as shown in formula (2):

$$\begin{cases} \dot{P}_i = -\omega_{ci} P_i + \omega_{ci}(V_{odi} i_{odi} + V_{oqi} i_{oqi}) \\ \dot{Q}_i = -\omega_{ci} Q_i + \omega_{ci}(V_{oqi} i_{odi} - V_{odi} i_{oqi}) \end{cases} \quad \text{formula (2)}$$

In formula (2), $\dot{P}_i$ denotes the change rate of active power of the $i^{th}$ distributed generation: W/S; $\omega_{ci}$ denotes the low-pass filter cutoff frequency of the $i^{th}$ distributed generation: rad/s; $V_{odi}$ denotes the d-axis component of the output voltage of the $i^{th}$ distributed generation in the dq reference coordinate of the $i^{th}$ distributed generation: V; $V_{oqi}$ denotes the q-axis component of the output voltage of the $i^{th}$ distributed generation in the dq reference coordinate of the $i^{th}$ distributed generation: V; $i_{odi}$ denotes the d-axis component of the output current of the $i^{th}$ distributed generation in the dq reference coordinate of the $i^{th}$ distributed generation: A; $i_{oqi}$ denotes the q-axis component of the output current of the $i^{th}$ distributed generation in the dq reference coordinate of the $i^{th}$ distributed generation: A; and $\dot{Q}_i$ denotes the change rate of the reactive power of the $i^{th}$ distributed generation: Var/S.

As the primary voltage control for each distributed generation enables the voltage magnitude on the q axis as zero, the secondary voltage control can be further obtained as formula (3):

$$\begin{cases} k_{Vi} \dot{V}_{odi} = V_{ni} - V_{odi} - n_{Qi} Q_i + u_i \\ V_{oqi} = 0 \end{cases} \quad \text{formula (3)}$$

In formula (3), $\dot{V}_{odi}$ denotes the change rate of the d-axis component of the output voltage of the $i^{th}$ distributed generation in the dq reference coordinate of the $i^{th}$ distributed generation: V/S; $V_{ni}$ denotes the output voltage reference value of the $i^{th}$ distributed generation, and $u_i$ denotes the secondary voltage control input: V.

The dynamic equation of the output current of the distributed generation is as shown in formula (4):

$$\begin{cases} \dot{i}_{odi} = -\frac{R_{ci}}{L_{ci}} i_{odi} + \omega_i i_{oqi} + \frac{1}{L_{ci}}(V_{odi} - V_{busdi}) \\ \dot{i}_{oqi} = -\frac{R_{ci}}{L_{ci}} i_{oqi} - \omega_i i_{odi} + \frac{1}{L_{ci}}(V_{oqi} - V_{busqi}) \end{cases} \quad \text{formula (4)}$$

In formula (4), $\dot{i}_{odi}$ denotes the change rate of the d-axis component of the output current of the $i^{th}$ distributed generation in the dq reference coordinate of the $i^{th}$ distributed generation: A/S; $R_{ci}$ denotes the connection resistance from the $i^{th}$ distributed generation to the bus i: Ω; $L_{ci}$ denotes the connection inductance from the $i^{th}$ distributed generation to the bus i: H; $V_{busdi}$ denotes the d-axis component of the voltage of the bus i in the dq reference coordinate of the $i^{th}$ distributed generation; $\dot{i}_{oqi}$ denotes the change rate of the q-axis component of the output current of the $i^{th}$ distributed generation in the dq reference coordinate of the $i^{th}$ distributed generation: A/S; and $V_{busqi}$ denotes the q-axis component of the voltage of the bus i in the dq reference coordinate of the $i^{th}$ distributed generation: V.

According to formulas (1) to (4), a dynamic equation of the it distributed generation is obtained, as shown in formula (5):

$$\begin{cases} \dot{x}_{invi} = f_{invi}(x_{invi}) + k_{invi}(x_{invi}) V_{busDQi} + h_{invi} \omega_{com} + g_{invi} u_i \\ i_{oDQi} = C_{invci} x_{invi} \end{cases} \quad \text{formula (5)}$$

In the formula, $\dot{x}_{invi}$ denotes the change rate of the state variable of the $i^{th}$ distributed generation, $\dot{x}_{invi} = [\dot{\delta}_i, \dot{P}_i, \dot{Q}_i, \dot{V}_{odi}, \dot{i}_{odi}, \dot{i}_{oqi}]^T$; $\dot{\delta}_i$ denotes the change rate of $\delta_i$; $x_{invi}$ denotes the state variable of the $i^{th}$ distributed generation, $x_{invi} = [\delta_i, P_i, Q_i, V_{odi}, i_{odi}, i_{oqi}]^T$; wherein $\delta_i$ denotes the phase angle difference between the dq axis of the dq reference coordinate of the $i^{th}$ distributed generation and the DQ axis in the common reference coordinate DQ of the microgrid: rad; $f_{invi}(x_{invi})$ denotes a state function of the $i^{th}$ distributed generation, and $k_{invi}(x_{invi})$ denotes a voltage disturbance function of the bus i; $V_{busDQi} = [V_{busDi}, V_{busQi}]^T$, and $V_{busDi}$ denotes the D-axis component of the bus i in the common reference coordinate DQ: V; $V_{busQi}$ denotes the Q-axis component of the bus i in the common reference coordinate DQ: V; $\omega_{com}$ denotes the angular frequency of the common reference coordinate: rad/s; $h_{invi}$ denotes a connection matrix of the angular frequency of the common reference coordinate; $g_{invi}$ denotes an input matrix of the it distributed generation; $i_{oDQi} = [i_{oDi}, i_{oQi}]^T$, $i_{oDi}$ denotes the D-axis component of the output current of the $i^{th}$ distributed generation in the common reference coordinate DQ, and $i_{oQi}$ denotes the Q-axis component of the output current of the $i^{th}$ distributed generation in the common reference coordinate DQ: A; and $C_{invi}$ denotes an output matrix of the $i^{th}$ distributed generation.

A current dynamic equation of the $i^{th}$ line between the bus i and the bus j is as shown in formula (6):

$$\begin{cases} \dot{i}_{lineDi} = -\frac{r_{linei}}{L_{linei}} i_{lineDi} + \omega_{com} i_{lineQi} + \frac{1}{L_{linei}}(V_{busDi} - V_{busDj}) \\ \dot{i}_{lineQi} = -\frac{r_{linei}}{L_{linei}} i_{lineQi} - \omega_{com} i_{lineDi} + \frac{1}{L_{linei}}(V_{busQi} - V_{busQj}) \end{cases} \quad \text{formula (6)}$$

In the formula, $\dot{i}_{lineDi}$ denotes the change rate of the D-axis component of the current of the it line in the common reference coordinate DQ: A/S; $r_{linei}$ denotes the line resistance of the it line: Ω; $L_{linei}$ denotes the line inductance of the it line: H; $i_{lineDi}$ denotes the D-axis component of the current of the $i^{th}$ line in the common reference coordinate DQ, and $i_{lineQi}$ denotes the Q-axis component of the current of the $i^{th}$ line in the common reference coordinate DQ: A; $V_{busDi}$ denotes the D-axis component of the bus i in the common reference coordinate DQ, $V_{busDj}$ denotes the D-axis component of the bus j in the common reference coordinate DQ, and $\dot{i}_{lineQi}$ denotes the change rate of the Q-axis component of the current of the it line in the common reference coordinate DQ: A/S; $V_{busQi}$ denotes the Q-axis component of the bus i in the common reference coordinate DQ: V; and $V_{busQj}$ denotes the Q-axis component of the bus j in the common reference coordinate DQ: V.

A current dynamic equation of the $j^{th}$ load connected to the bus j is as shown in formula (7):

$$\begin{cases} \dot{i}_{loadDj} = -\dfrac{R_{loadj}}{L_{loadj}} i_{loadDj} + \omega_{com} i_{loadQj} + \dfrac{1}{L_{loadj}} V_{busDj} \\ \dot{i}_{loadQj} = -\dfrac{R_{loadj}}{L_{loadj}} i_{loadQj} - \omega_{com} i_{loadDj} + \dfrac{1}{L_{loadj}} V_{busQj} \end{cases} \quad \text{formula (7)}$$

In the formula, $\dot{i}_{loadDj}$ denotes the change rate of the D-axis component of the current of the $j^{th}$ load in the common reference coordinate DQ: A/S; $R_{loadj}$ denotes the load resistance of the $j^{th}$ load: Ω; $L_{loadj}$ denotes the load inductance of the $j^{th}$ load: H; $i_{loadDj}$ denotes the D-axis component of the current of the $j^{th}$ load in the common reference coordinate DQ, and $i_{loadQj}$ denotes the Q-axis component of the current of the $j^{th}$ load in the common reference coordinate DQ: A; and $\dot{i}_{loadQj}$ denotes the change rate of the Q-axis component of the current of the $j^{th}$ load in the common reference coordinate DQ: A/S.

According to formulas (5)-(7), the large-signal model of microgrid including n distributed generations, s buses and p loads is as shown in formula (8):

$$\begin{cases} \dot{x} = f(x) + gu \\ y_i = h_i(x) \end{cases} \quad \text{formula (8)}$$

Wherein, $x=[x_{inv1} \ldots x_{invn}, i_{lineDQ1} \ldots i_{lineDQs}, i_{loadDQ1} \ldots i_{loadDQp}]^T$, $x_{inv1}$ denotes the state variable of the $1^{st}$ distributed generation, $x_{invn}$ denotes the state variable of the $n^{th}$ distributed generation, $i_{lineDQ1}=[i_{lineD1}, i_{lineQ1}]^T$, $i_{lineD1}$ denotes the D-axis component of the current of the $1^{st}$ line in the common reference coordinate DQ, $i_{lineQ1}$ denotes the Q-axis component of the current of the $1^{st}$ line in the common reference coordinate DQ, $i_{lineDQs}=[i_{lineDs}, i_{lineQs}]^T$, $i_{lineDs}$ denotes the D-axis component of the current of the st line in the common reference coordinate DQ, $i_{lineQs}$ denotes the Q-axis component of the current of the $s^{th}$ line in the common reference coordinate DQ, $i_{loadDQ1}=[i_{loadD1}, i_{loadQ1}]^T$, $i_{loadD1}$ denotes the D-axis component of the current of the $1^{st}$ load in the common reference coordinate DQ, $i_{loadQ1}$ denotes the Q-axis component of the current of the $1^{st}$ load in the common reference coordinate DQ, $i_{loadDQp}=[i_{loadDp}, i_{loadQp}]^T$, $i_{loadDp}$ denotes the D-axis component of the current of the pt load in the common reference coordinate DQ, and $i_{loadQp}$ denotes the Q-axis component of the current of the $p^{th}$ load in the common reference coordinate DQ; $u=[u_1 \ldots u_n]^T$, $u_1$ denotes the secondary control quantity of the $1^{st}$ distributed generation, and $u_n$ denotes the secondary control quantity of the $n^{th}$ distributed generation; f(x) denotes a state function of the microgrid; g denotes an input matrix, and $y_i$ denotes an output value of the $i^{th}$ distributed generation; and $h_i(x)$ denotes an output function of the $i^{th}$ distributed generation.

Step 20), establish a Luenberger-like nonlinear state observer for each distributed generation. Step 20) specifically includes:

according to the microgrid large-signal model established in step 10), establish a local Luenberger nonlinear state observer for each distributed generation in the DSP, as shown in formula (9):

$$\dot{\hat{x}} = f(\hat{x}) + g\,u + L(h_i(\hat{x}) - y_i) \quad \text{formula (9)}$$

In the formula, $\hat{x}$ denotes the estimated state values of the microgrid in formula (8), $\dot{\hat{x}}$ denotes the change rate of the estimated state values in the microgrid; $f(\hat{x})$ denotes a connection matrix of the microgrid under the action of the estimated value; L denotes a Luenberger state observer matrix; and $h_i(\hat{x})$ denotes an output function of the $i^{th}$ distributed generation corresponding to the estimated state value $\hat{x}$.

Step 30), The data acquisition module of each distributed generation collects the output voltage $V_{odi}$ and output current $i_{odi}$ and $i_{oqi}$ from the local sensor, which are to be sent to the nonlinear state observer of respective DSP in step 20). Estimate the output voltages and output powers other distributed generations in real time according to a local measured value of each distributed generation Step 40), The microgrid voltage reference instruction is entered through a human-machine interface and sent out to each distributed generation via the 485 communication mode. Based on the local measured value of each distributed generation and the estimated measurement of other distributed generations, the decentralized secondary voltage control is implemented to satisfy the requirements of accurate reactive power sharing and voltage restoration. The resultant secondary voltage compensation term is transmitted to the PWM module of the local controller; the generated PWM pulse signal is sent to the drive and power amplifier unit to trigger the power electronic switching transistor. Step 40) specifically includes:

the reactive power sharing indicates that the output reactive power of each distributed generation is allocated according to the power capacity, and the implementation process is as shown in formula (10):

$$\begin{cases} \delta Q_i = k_{PQ}(Q_i^* - Q_i) + k_{iQ} \int (Q_i^* - Q_i) dt \\ Q_i^* = \dfrac{1/n_{Qi}}{\sum\limits_{j=1}^{n} 1/n_{Qj}} \left( Q_i + \sum\limits_{j=1, j \neq i}^{n} \hat{Q}_j \right) \end{cases} \quad \text{formula (10)}$$

In the formula, $\delta Q_i$ denotes a reactive power control signal for each calculation cycle; $k_{PQ}$ denotes a proportional coefficient in the reactive power proportional integral controller; $Q^*_i$ denotes the reactive power reference of the $i^{th}$ distributed generation; $k_{iQ}$ denotes an integral coefficient in the reactive power proportional integral controller; $n_{Qj}$ denotes a voltage droop coefficient of the $j^{th}$ distributed generation; and $\hat{Q}_j$ denotes a reactive power estimation value of the $j^{th}$ distributed generation.

The voltage restoration indicates that the average value of the output voltages of the distributed generations through the microgrid is restored to the rated value, and the implementation process is as shown in formula (11):

$$\begin{cases} \delta V_i = k_{PE}(V^* - \overline{V}_i) + k_{iE} \int (V^* - \overline{V}_i) dt \\ \overline{V}_i = \left( V_{odi} + \sum\limits_{j=1, j \neq i}^{n} \hat{V}_{odj} \right) \bigg/ n \end{cases} \quad \text{formula (11)}$$

In the formula, $\delta V_i$ denotes an average voltage restoration control signal for each calculation cycle; $k_{PE}$ denotes a proportional coefficient in the average voltage controller; $V^*$ denotes a voltage rated value; $\overline{V}_i$ denotes an average value of output voltages of all the distributed generations as estimated from the $i^{th}$ distributed generation; $k_{iE}$ denotes an integral coefficient in the average voltage controller; and $\hat{V}_{odj}$ denotes an estimated value of the d-axis component of the output current of the $j^{th}$ distributed generation in the dq reference coordinate of the $j^{th}$ distributed generation.

By combining formulas (10) and (11), the secondary voltage control input for the $i^{th}$ distributed generation is as shown in formula (12):

$$u_i = \delta Q_i + \delta V_i \qquad \text{formula (12).}$$

In the above embodiment, the common reference coordinate DQ refers to the dq reference coordinate of the $1^{st}$ distributed generation, and the state variables of the remaining distributed generations, buses and loads are converted to the common reference coordinate DQ through coordinate transformation. In step 10), the frequency droop coefficient $m_{Pi}$ is determined according to the active power capacity of each distributed generation; and the voltage droop characteristic coefficient $n_{Qi}$ is determined according to the reactive power capacity of each distributed generation. In step 40), the decentralized voltage control of reactive power sharing and average voltage restoration is implemented based on the estimated value of each distributed generation on real-time states of other distributed generations, which does not rely on communication.

In the present embodiment, the state of each distributed generation in the microgrid is estimated in real time through a nonlinear state observer based on a microgrid large-signal model, thereby realizing the decentralized secondary control in the microgrid. Compared with the conventional centralized or distributed secondary control method, the control method provided in the present embodiment avoids the problems of communication latency and information dropout due to the communication independence. According to the microgrid voltage control method based on the nonlinear state observer in the present embodiment, the output voltage and output reactive power of other distributed generations are estimated in real time through operation data of local output voltage, output current and the like, so that the reactive power sharing and average voltage restoration in microgrid independent from a communication technology are realized, the power quality is effectively improved and the system stability and the dynamic performance are improved.

Figure 4:
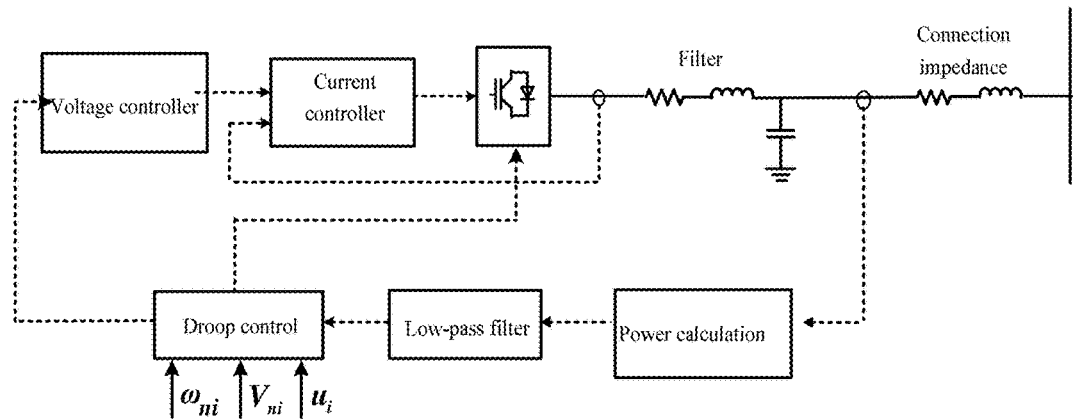
FIG. 4 is a block diagram of microgrid distributed generation control according to an embodiment of the present invention.

The block diagram of distributed generation control in the embodiment of the present invention is as shown in FIG. 4. The control block diagram mainly includes three parts, wherein the first part is power calculation, the second part is droop control, and the third part is voltage and current double-loop control. The power calculation includes acquiring the local output voltage and output current, and calculating the output active power and reactive power; the power calculated by the power calculation is obtained by a low-pass filter, and the droop control includes calculating the output voltage reference value and frequency reference value of each distributed generation; and the output voltage reference is transmitted to the voltage and current double-loop controller, and the frequency reference value acts on inverter operation.

Figure 5:
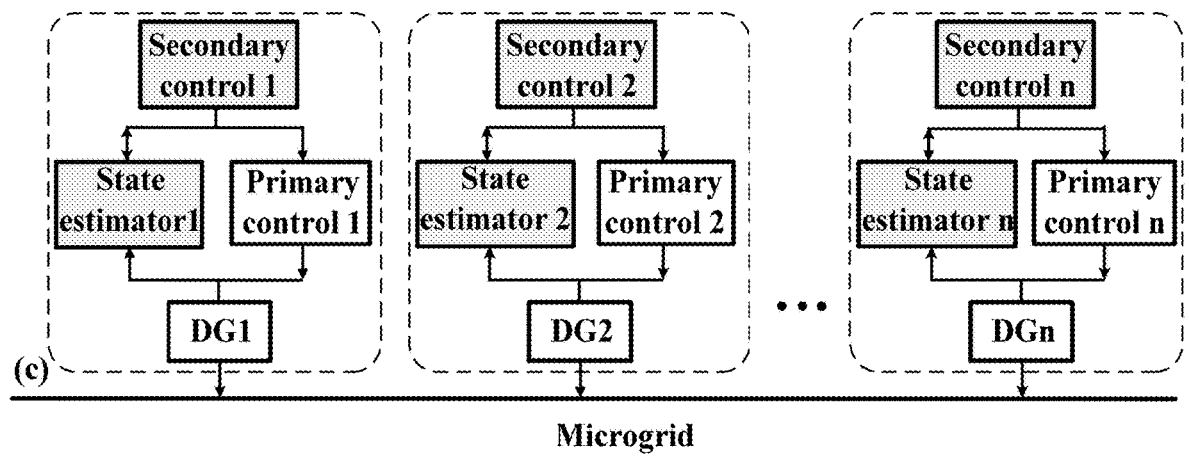
FIG. 5 is a structure diagram of the decentralized voltage control according to an embodiment of the present invention.

The structure block diagram of the decentralized voltage control in the embodiment of the present invention is as shown in FIG. 5. N distributed generations form a microgrid through a connection network, and each distributed generation acquires local operation data, estimates output voltages and output reactive power of other distributed generations in real time according to the local nonlinear state observer, and generates a secondary voltage control input in the local secondary controller, which is eventually transmitted to the local primary controller. Through the real-time estimation of the nonlinear state observers, decentralized secondary control which does not rely on high-performance sensors and high-pass bandwidth is implemented, thereby avoiding the problems of communication latency and data drop-out in the communication process, effectively improving the power quality.

An embodiment is given below.

Figure 6:
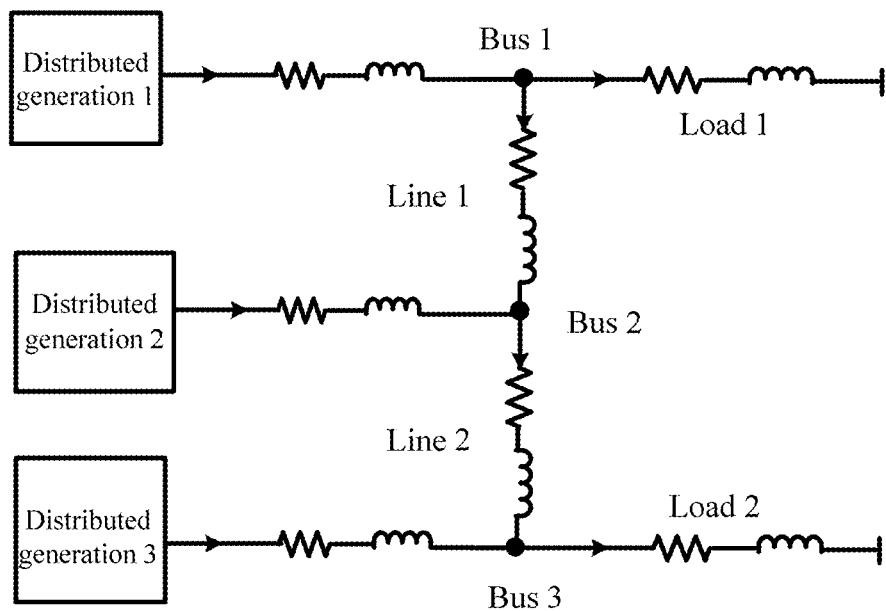
FIG. 6 is a diagram of a microgrid test system adopted in an embodiment of the present invention.

A simulation system is as shown in FIG. 6. The microgrid consists of three distributed generations, two connection lines and two loads. The load 1 is connected to bus 1, and the load 2 is connected to bus 2. The loads in the system are impedance-type loads. Assuming that the capacity ratio of the distributed generation 1, the distributed generation 2 and the distributed generation 3 is 1:1.5:2, the frequency droop coefficients and the voltage droop coefficients for corresponding ratios are designed so that the desired output active power and reactive power ratio of the distributed generations is 1:1.5:2. A simulated microgrid model is built based on the MATLAB/Simulink platform. The microgrid voltage control effect is simulated to compare the secondary voltage control method of the present invention with the conventional secondary voltage control method. The conventional secondary voltage control method adopts the centralized control format.

Figure 7A:
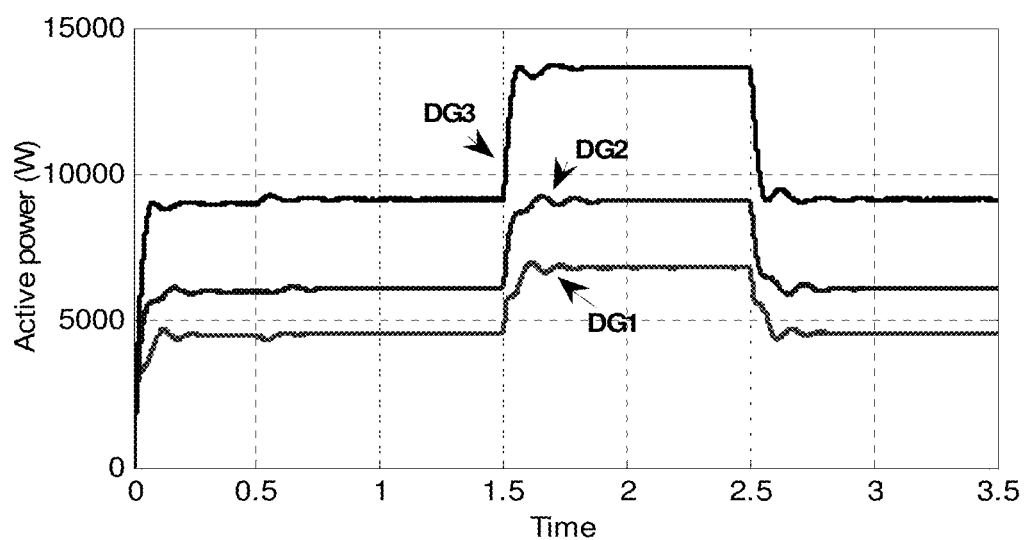
FIG. 7($a$) is a control effect diagram of output active power throughout a microgrid adopting a conventional latency-free centralized control method.
Figure 7B:
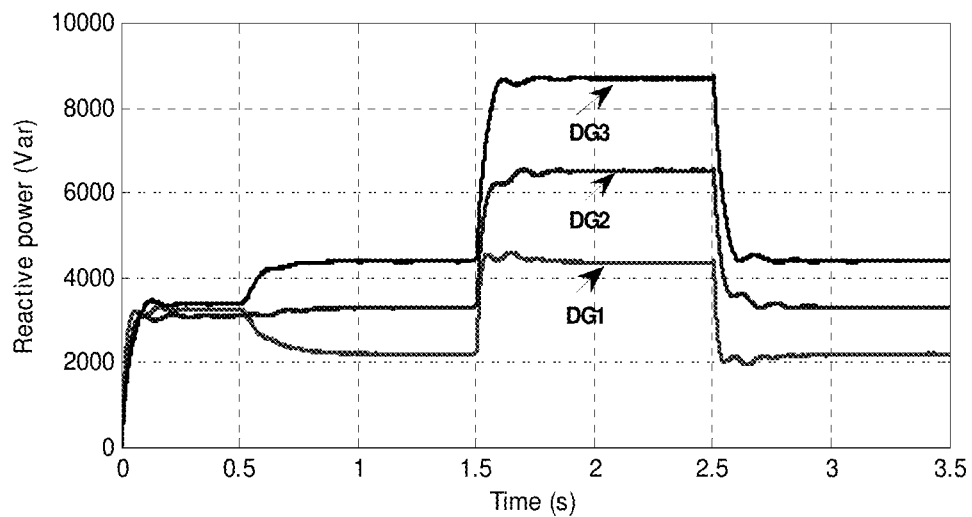
Figure 7C:
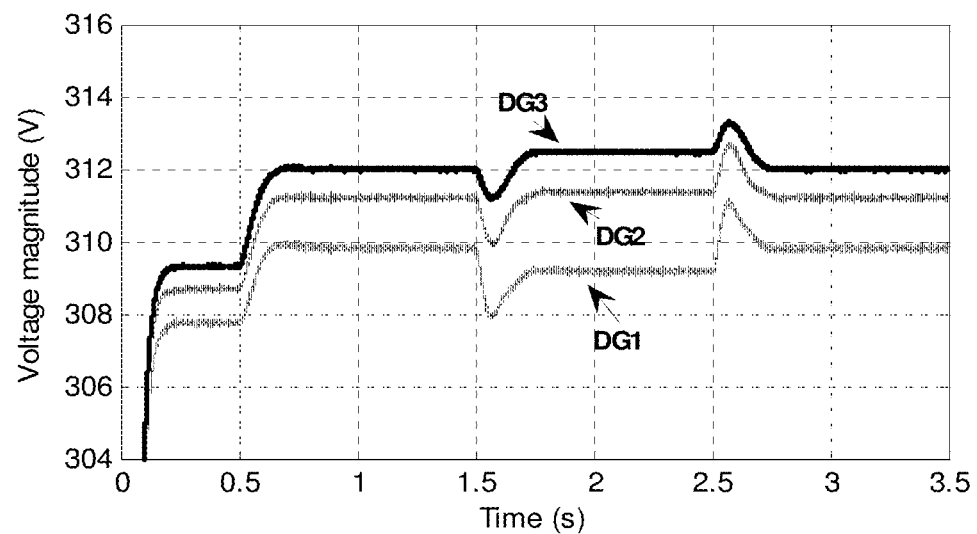

FIG. 7 shows simulation results when the microgrid adopts a conventional centralized control method without communication latency. At the beginning of operation, each distributed generation is operated in a droop control mode, and a centralized secondary control method is adopted at 0.5 s. A 10 kW/5 kVar load is added to bus 3 at 1.5 s, and the load is removed at 2.5 s, with the simulation results shown in FIG. 7. FIG. 7(a) shows an output curve diagram of active power of each distributed generation in the microgrid, where the abscissa represents time in second, and the ordinate represents active power in watt. As shown in FIG. 7(a), at the beginning, under the action of droop control, the output active power of each distributed generation is allocated according to the ratio of the droop coefficients, that is, P1:P2:P3=1:1.5:2. After 1.5 s, the power is increased proportionally for each distributed generation to meet the power supply for the newly added load. After 2.5 s, the power is reduced proportionally for each distributed generation. From FIG. 7(a), it can be known that active power is supplied to each distributed generation according to the capacity regardless of droop control or secondary control. FIG. 7(b) is the curve diagram of reactive power of individual distributed generations in the microgrid, where the abscissa represents time in second, and the ordinate represents reactive power in var. From FIG. 7(b), it can be seen that the reactive power sharing effect is not ideal under the droop action at first; and after 0.5 s, no matter whether the load increases or decreases, the reactive power is allocated according to the ratio of the droop coefficient, that is, Q1:Q2:Q3=1:1.5:2. According to FIG. 7(b), under the action of secondary control, the reactive power sharing effect of the microgrid is significantly improved. FIG. 7 (c) is the curve diagram of output voltage of individual distributed generations in the microgrid, where the abscissa represents time in second, and the ordinate represents voltage in volt. From FIG. 7(c), it can be seen that the output voltage of each distributed generation under the droop action has a steady-state deviation at first; and after 0.5 s, no matter whether the load increases or decreases, the voltage magnitude is improved and the average voltage is restored to a rated value. According to FIG.

7(c), under the action of secondary control, the dynamics of the voltage throughout the microgrid is improved.

Figure 8A:
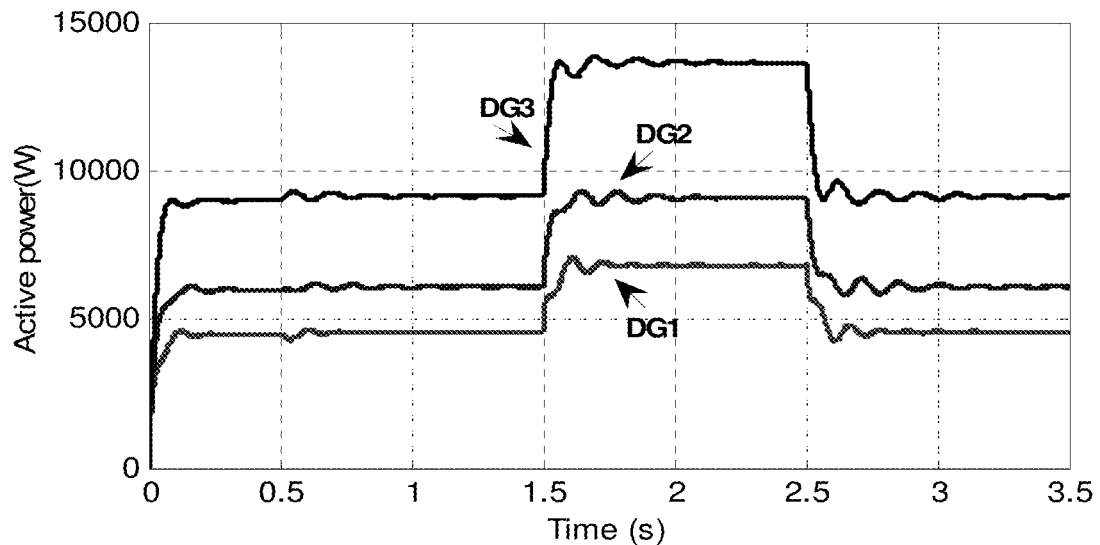
FIG. 8($a$) is a control effect diagram of output active power of a microgrid adopting a control method according to an embodiment of the present invention.
Figure 8B:
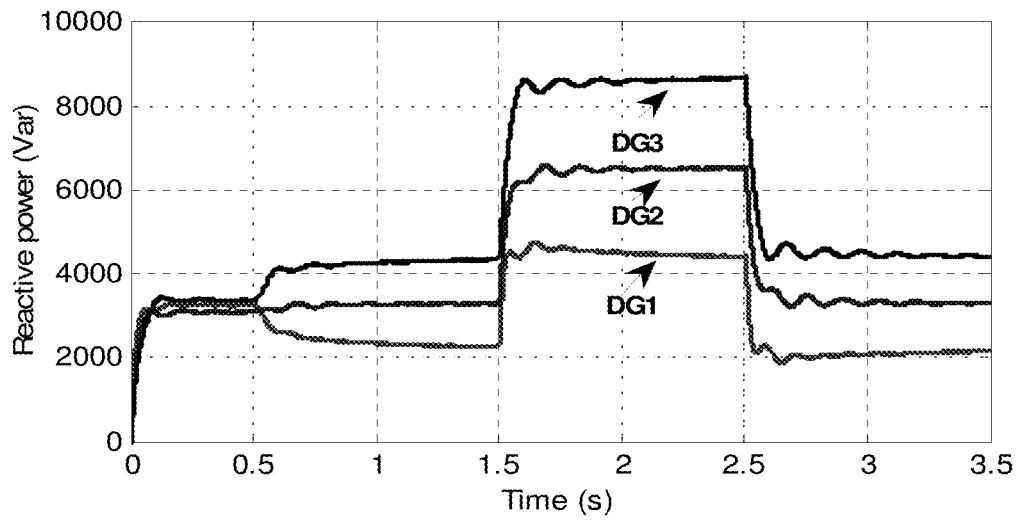
Figure 8C:
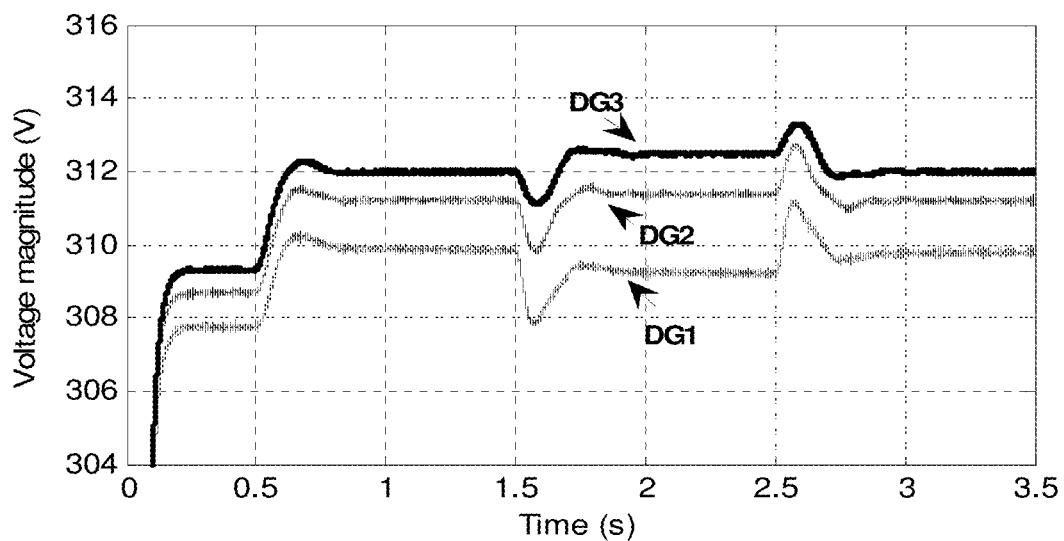

FIG. 8 shows simulation results when the microgrid adopts a decentralized control method according to an embodiment of the present invention. At the beginning of operation, each distributed generation operates in a droop control mode, and a centralized secondary control method is adopted at 0.5 s. A 10 kW/5 kVar load is added for the bus 3 at 1.5 s, and the load is removed at 2.5 s. The simulation results are as shown in FIG. 8. FIG. 8(a) shows the output curve diagram of active power of each distributed generation in the microgrid, where the abscissa represents time in second, and the ordinate represents active power in watt. As shown in FIG. 8(a), at the beginning, under the action of droop control, the output active power of each distributed generation is allocated according to the ratio of the droop coefficient, that is, P1:P2:P3=1:1.5:2. After 1.5 s, the power is increased proportionally for each distributed generation to meet the power supply for the newly added load. After 2.5 s, the power is reduced proportionally for each distributed generation. FIG. 8(b) is the curve diagram of reactive power of individual distributed generations in the microgrid, where the abscissa represents time in second, and the ordinate represents reactive power in var. From FIG. 8(b), it can be seen that the reactive power sharing effect is not ideal under the droop action at first; and after 0.5 s, no matter whether the load increases or decreases, the reactive power is allocated according to the ratio of the droop coefficient. According to FIG. 8(b), under the action of secondary control, the reactive power sharing effect of the microgrid is significantly improved. FIG. 8 (c) is the curve diagram of output voltage of individual distributed generations in the microgrid, where the abscissa represents time in second, and the ordinate represents voltage in volt. From FIG. 8(c), it can be seen that the output voltage of each distributed generation under the droop action has a steady-state deviation at first; and after 0.5 s, no matter whether the load increases or decreases, the voltage magnitude is improved and the average voltage is restored to a rated value. From FIGS. 7(a)-(c) and FIGS. 8(a)-(c), compared with a latency-free centralized control method, the control effect of the decentralized control method according to the embodiment of the present invention slightly declines in the absence of communication latency, but it still can achieve the control objectives of reactive power sharing and voltage restoration.

Figure 9A:
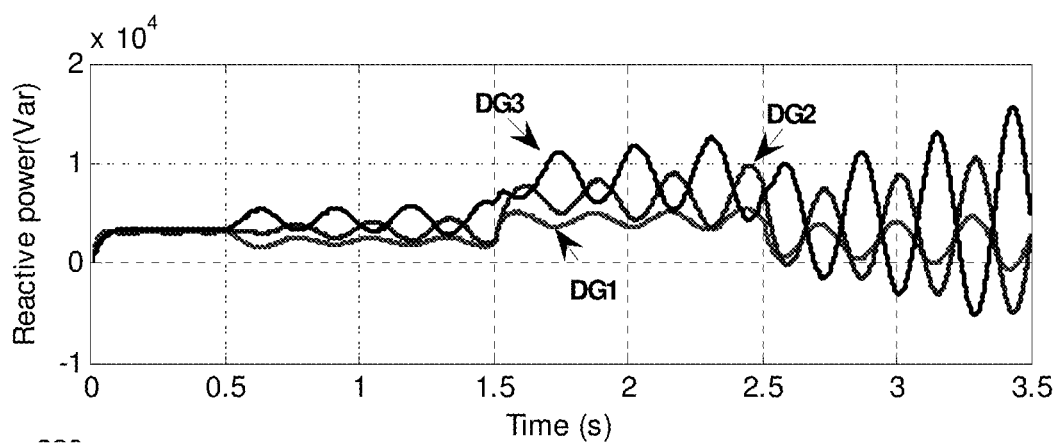
FIG. 9($a$) is a control effect diagram of output reactive power of a microgrid adopting a conventional latent centralized control method.
Figure 9B:
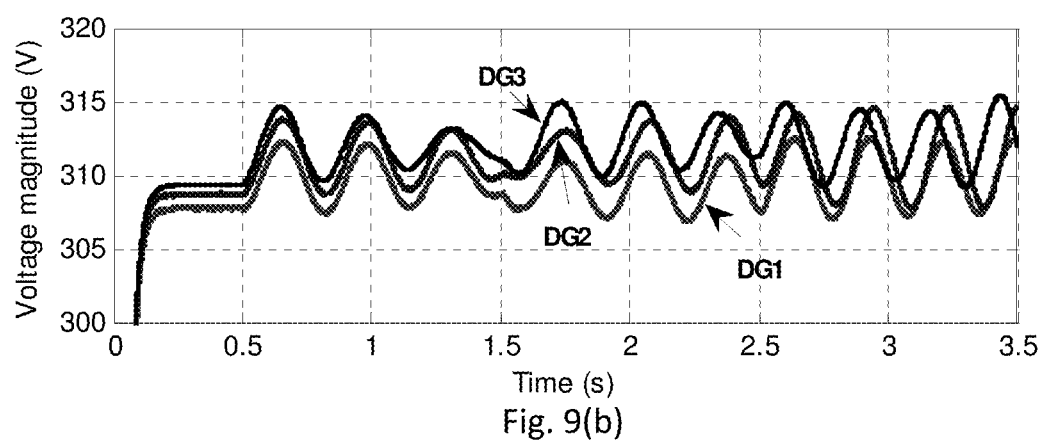

In order to show the advantages of the decentralized control method according to the embodiment of the present invention regarding the communication-free characteristics, FIG. 9 shows simulation results of the microgrid adopting a communication latency 200 ms. At the beginning of operation, each distributed generation is operated in a droop control mode, and a centralized secondary control method is adopted at 0.5 s. A 10 kW/5 kVar load is added for the bus 3 at 1.5 s, and the load is removed at 2.5 s. The simulation results are as shown in FIG. 9. FIG. 9(a) shows the curve diagram of output reactive power of each distributed generation in the microgrid, where the abscissa represents time in second, and the ordinate represents active power in var. FIG. 9(b) is the curve diagram of output voltage of each distributed generation in the microgrid, where the abscissa represents time in second, and the ordinate represents the voltage magnitude in volt. As shown in FIGS. 9(a) and 9(b), under the communication latency 200 ms, both the reactive power and the output voltage experience violent oscillation and eventually the system is instable. Therefore, the communication latency has an important influence on the dynamic performance of the system. However, the decentralized control method in the embodiment of the present invention, as shown in FIGS. 8(a)-8(c), can avoid the influence of the communication process.

The control method according to the embodiment of the present invention is a decentralized voltage control method based on nonlinear state observers in a microgrid. The state observer of the local distributed generation estimates the output voltage and reactive power of other distributed generations in real time for secondary voltage control to achieve reactive power sharing and average voltage restoration. The method of the present embodiment is a decentralized control method, which does not rely on remote measurement and communication network, thereby avoiding the problems of communication latency and data drop-out in the conventional voltage control and improving the accurate reactive power sharing and voltage dynamics of the microgrid.

The basic principles, main features and advantages of the present invention are shown and described above. It should be understood by the technical personnel in the field that the present invention is not limited by the specific embodiments described above, and the descriptions in the foregoing specific embodiments and specification are only for further illustrating the principle of the present invention.

Various changes and modifications may be made to the present invention without departing from the spirit and scope of the present invention, with all these changes and modifications falling within the scope of the present invention. The protection scope of the present invention is defined by the claims and the equivalents thereof.

What is claimed is:

1. A method for controlling a decentralized voltage for a microgrid based on nonlinear state observers, characterized by comprising the following steps:

step 10) scanning connection/disconnection statuses of all DG (Distributed Generation) units, loading and querying data;

establishing a large-signal microgrid model with distributed generations, a connection network and impedance-type loads;

step 20), establishing a nonlinear state observer for each of the distributed generations in a DSP (Digital Signal Processor):

step 30), collecting output voltage $V_{odi}$ and output current $i_{odi}$ and $i_{oqi}$ from a local sensor, sending the output voltage $V_{odi}$ and output current $i_{odi}$ and $i_{oqi}$ to the nonlinear state observer;

step 40), entering a microgrid voltage reference instruction by a human-machine interface, and sending the microgrid voltage reference instruction to the distributed generations via a 485 communication module that is a type of communication module; performing the decentralized voltage control by the distributed generations;

wherein:

the step 10) further comprising: there are N distributed generations; each distributed generation employs a droop control to generate the output voltage and frequency reference for individual inverters, as shown in formula (1):

$$\begin{cases} \omega_i = \omega_n - m_{Pi} P_i \\ k_{Vi} \dot{V}_{o,magi} = V_n - V_{o,magi} - n_{Qi} Q_i \end{cases} \quad \text{formula (1)}$$

in formula (1), $\omega_i$ denotes the local angular frequency of the $i^{th}$ distributed generation; $\omega_n$, denotes the local angular frequency reference value of the distributed generation: rad/s; $m_{Pi}$ denotes the frequency droop characteristic coefficient of the $i^{th}$ distributed generation: rad/s; $P_i$ denotes the actual output active power of the $i^{th}$ distributed generation: W; $k_{Vi}$ denotes a droop control gain of the $i^{th}$ distributed generation; $\dot{V}_{o,magi}$ denotes the change rate of the output voltage of the $i^{th}$ distributed generation: V/S; $V_n$ denotes the output voltage reference value of the distributed generation: V; $V_{o,magi}$ denotes the output voltage of the $i^{th}$ distributed generation: V; $n_{Qi}$ denotes the voltage droop characteristic coefficient of the $i^{th}$ distributed generation: V/Var; $Q_i$ denotes the actual output reactive power of the $i^{th}$ distributed generation: Var;

the actual output active power $P_i$ and reactive power $Q_i$ of the $i^{th}$ distributed generation are obtained through a low-pass filter, as shown in formula (2):

$$\begin{cases} \dot{P}_i = -\omega_{ci}P_i + \omega_{ci}(V_{odi}i_{odi} + V_{oqi}i_{oqi}) \\ \dot{Q}_i = -\omega_{ci}Q_i + \omega_{ci}(V_{oqi}i_{odi} - V_{odi}i_{oqi}) \end{cases} \quad \text{formula (2)}$$

in formula (2), $\dot{P}_i$ denotes the change rate of active power of the $i^{th}$ distributed generation: W/S; $\omega_{ci}$ denotes the low-pass filter cutoff frequency of the $i^{th}$ distributed generation: rad/s; $V_{odi}$ denotes the d-axis component of the output voltage of the $i^{th}$ distributed generation in the dq reference coordinate of the $i^{th}$ distributed generation: V; $V_{oqi}$ denotes the q-axis component of the output voltage of the $i^{th}$ distributed generation in the dq reference coordinate of the $i^{th}$ distributed generation: V; $i_{odi}$ denotes the d-axis component of the output current of the $i^{th}$ distributed generation in the dq reference coordinate of the $i^{th}$ distributed generation: A; $i_{oqi}$ denotes the q-axis component of the output current of the $i^{th}$ distributed generation in the dq reference coordinate of the $i^{th}$ distributed generation: A; $\dot{Q}_i$ denotes the reactive power change rate of the $i^{th}$ distributed generation: Var/S;

as a primary voltage control for each distributed generation enables the voltage magnitude on the q axis as zero, a secondary voltage control can be further obtained as formula (3):

$$\begin{cases} k_{Vi}\dot{V}_{odi} = V_{ni} - V_{odi} - n_{Qi}Q_i + u_i \\ V_{oqi} = 0 \end{cases} \quad \text{formula (3)}$$

in formula (3), $\dot{V}_{odi}$ denotes the change rate of the d-axis component of the output voltage of the $i^{th}$ distributed generation in the dq reference coordinate of the $i^{th}$ distributed generation: V/S; $V_{ni}$ denotes the output voltage reference value of the $i^{th}$ distributed generation, and $u_i$ denotes the secondary voltage control quantity: V;

a dynamic equation of the output current of the distributed generation is as shown in formula (4):

$$\begin{cases} \dot{i}_{odi} = -\dfrac{R_{ci}}{L_{ci}}i_{odi} + \omega_i i_{oqi} + \dfrac{1}{L_{ci}}(V_{odi} - V_{busdi}) \\ \dot{i}_{oqi} = -\dfrac{R_{ci}}{L_{ci}}i_{oqi} - \omega_i i_{odi} + \dfrac{1}{L_{ci}}(V_{oqi} - V_{busqi}) \end{cases} \quad \text{formula (4)}$$

in formula (4), $\dot{i}_{odi}$ denotes the change rate of the d-axis component of the output current of the $i^{th}$ distributed generation in the dq reference coordinate of the $i^{th}$ distributed generation: A/S; $R_{ci}$ denotes the connection resistance from the $i^{th}$ distributed generation to the bus i: Ω; $L_{ci}$ denotes the connection inductance from the $i^{th}$ distributed generation to the bus i: H; $V_{busdi}$ denotes the d-axis component of the voltage of the bus i in the dq reference coordinate of the $i^{th}$ distributed generation; $\dot{i}_{oqi}$ denotes the change rate of the q-axis component of the output current of the $i^{th}$ distributed generation in the dq reference coordinate of the $i^{th}$ distributed generation: A/S; $V_{busqi}$ denotes the q-axis component of the voltage of the bus i in the dq reference coordinate of the $i^{th}$ distributed generation: V;

according to formulas (1) to (4), a dynamic equation of the $i^{th}$ distributed generation is obtained, as shown in formula (5):

$$\begin{cases} \dot{x}_{invi} = f_{invi}(x_{invi}) + k_{invi}(x_{invi})V_{busDQi} + h_{invi}\omega_{com} + g_{invi}u_i \\ i_{oDQi} = C_{invci}x_{invi} \end{cases} \quad \text{formula (5)}$$

in the formula, $\dot{x}_{invi}$ denotes the change rate of the state variable of the $i^{th}$ distributed generation, $\dot{x}_{invi} = [\dot{\delta}_i, \dot{P}_i, \dot{Q}_i, \dot{V}_{odi}, \dot{i}_{odi}, \dot{i}_{oqi}]^T$; $\dot{\delta}$ denotes the change rate of $\delta_i$; $x_{invi}$ denotes the state variable of the $i^{th}$ distributed generation, $x_{invi} = [\delta_i, P_i, Q_i, V_{odi}, i_{odi}, i_{oqi}]^T$; wherein $\delta_i$ denotes the phase angle difference between the dq axis of the dq reference coordinate of the $i^{th}$ distributed generation and the DQ axis in the common reference coordinate DQ of the microgrid: rad; $f_{invi}(x_{invi})$ denotes a state function of the $i^{th}$ distributed generation, and $k_{invi}(x_{invi})$ denotes a voltage disturbance function of the bus i; $V_{busDQi} = [V_{busDi}, V_{busQi}]^T$, and $V_{busDi}$ denotes the D-axis component of the bus i in the common reference coordinate DQ: V; $V_{busQi}$ denotes the Q-axis component of the bus i in the common reference coordinate DQ: V; $\omega_{com}$ denotes the angular frequency of the common reference coordinate: rad/s; $h_{invi}$ denotes a connection matrix of the angular frequency of the common reference coordinate; $g_{invi}$ denotes an input matrix of the $i^{th}$ distributed generation; $i_{oDQi} = [i_{oDi}, i_{oQi}]^T$, $i_{oDi}$ denotes the D-axis component of the output current of the $i^{th}$ distributed generation in the common reference coordinate DQ, and $i_{oQi}$ denotes the Q-axis component of the output current of the $i^{th}$ distributed generation in the common reference coordinate DQ: A; $C_{invci}$ denotes an output matrix of the $i^{th}$ distributed generation;

a current dynamic equation of the $i^{th}$ line between the bus i and the bus j is as shown in formula (6):

$$\begin{cases} \dot{i}_{lineDi} = -\dfrac{r_{linei}}{L_{linei}}i_{lineDi} + \omega_{com}i_{lineQi} + \dfrac{1}{L_{linei}}(V_{busDi} - V_{busDj}) \\ \dot{i}_{lineQi} = -\dfrac{r_{linei}}{L_{linei}}i_{lineQi} - \omega_{com}i_{lineDi} + \dfrac{1}{L_{linei}}(V_{busQi} - V_{busQj}) \end{cases} \quad \text{formula (6)}$$

in the formula, $\dot{i}_{lineDi}$ denotes the change rate of the D-axis component of the current of the $i^{th}$ line in the common reference coordinate DQ: A/S; $r_{linei}$ denotes the line resistance of the $i^{th}$ line: Ω; $L_{linei}$ denotes the line inductance of the $i^{th}$ line: H; $i_{lineDi}$ denotes the D-axis component of the current of the $i^{th}$ line in the common reference coordinate DQ, and $i_{lineQi}$ denotes the Q-axis component of the current of the $i^{th}$ line in the common reference coordinate DQ: A; $V_{busDi}$ denotes the D-axis component of the bus i in the common reference coordinate DQ, $V_{busDj}$ denotes the D-axis component of the bus j in the common reference coordinate DQ, and $\dot{i}_{lineQi}$ denotes the change rate of the Q-axis component of the current of the $i^{th}$ line in the common reference coordinate DQ: A/S; $V_{busQi}$ denotes the Q-axis component of the bus i in the common reference coordinate DQ: V; $V_{busQj}$ denotes the Q-axis component of the bus j in the common reference coordinate DQ: V;

a current dynamic equation of the $j^{th}$ load connected to the bus j is as shown in formula (7):

$$\begin{cases} \dot{i}_{loadDj} = -\frac{R_{loadj}}{L_{loadj}} i_{loadDj} + \omega_{com} i_{loadQj} + \frac{1}{L_{loadj}} V_{busDj} \\ \dot{i}_{loadQj} = -\frac{R_{loadj}}{L_{loadj}} i_{loadQj} - \omega_{com} i_{loadDj} + \frac{1}{L_{loadj}} V_{busQj} \end{cases} \quad \text{formula (7)}$$

in the formula, $\dot{i}_{loadDj}$ denotes the change rate of the D-axis component of the current of the $j^{th}$ load in the common reference coordinate DQ: A/S; $R_{loadj}$ denotes the load resistance of the $j^{th}$ load: QS; $L_{loadj}$ denotes the load inductance of the $j^{th}$ load: H; $i_{loadDj}$ denotes the D-axis component of the current of the $j^{th}$ load in the common reference coordinate DQ, and $i_{loadQj}$ denotes the Q-axis component of the current of the $j^{th}$ load in the common reference coordinate DQ: A; and $\dot{i}_{loadQj}$ denotes the change rate of the Q-axis component of the current of the $j^{th}$ load in the common reference coordinate DQ: A/S;

according to formulas (5)-(7), the large-signal model of microgrid including n distributed generations, s buses and p loads is as shown in formula (8):

$$\begin{cases} \dot{x} = f(x) + gu \\ y_i = h_i(x) \end{cases} \quad \text{formula (8)}$$

wherein, $x=[x_{inv1}, \ldots, x_{invn}, i_{lineDQ1}, \ldots, i_{lineDQs}, i_{loadDQ1}, \ldots, i_{loadDQp}]^T$, $x_{inv1}$ denotes the state variable of the $1^{st}$ distributed generation, $x_{invn}$ denotes the state variable of the $n^{th}$ distributed generation, $i_{lineDQ1} = [i_{lineD1}, i_{lineQ1}]^T$, $i_{lineD1}$ denotes the D-axis component of the current of the $1^{st}$ line in the common reference coordinate DQ, $i_{lineQ1}$ denotes the Q-axis component of the current of the $1^{st}$ line in the common reference coordinate DQ, $i_{lineDQs}=[i_{lineDs}, i_{lineQs}]^T$, $i_{lineDs}$ denotes the D-axis component of the current of the $s^{th}$ line in the common reference coordinate DQ, $i_{lineQs}$ denotes the Q-axis component of the current of the $s^{th}$ line in the common reference coordinate DQ, $i_{loadDQ1}=[i_{loadD1}, i_{loadQ1}]^T$, $i_{loadD1}$ denotes the D-axis component of the current of the $1^{st}$ load in the common reference coordinate DQ, $i_{loadQ1}$ denotes the Q-axis component of the current of the $1^{st}$ load in the common reference coordinate DQ, $i_{loadDQp}=[i_{loadDp}, i_{loadQp}]^T$, $i_{loadDp}$ denotes the D-axis component of the current of the $p^{th}$ load in the common reference coordinate DQ, and $i_{loadQp}$ denotes the Q-axis component of the current of the $p^{th}$ load in the common reference coordinate DQ; $u=[u_1 \ldots u_n]T$, $u_1$ denotes the secondary control quantity of the $1^{st}$ distributed generation, and $u_n$ denotes the secondary control quantity of the $n^{th}$ distributed generation; f(x) denotes a state function of the microgrid; g denotes an input matrix, and $y_i$ denotes an output value of the $i^{th}$ distributed generation; $h_i(x)$ denotes an output function of the $i^{th}$ distributed generation;

the step 20) further comprising: the nonlinear state observer is a local Luenberger nonlinear state observer, as shown in formula (9):

$$\dot{\hat{x}}=f(\hat{x})+g\, u+L(h_i(\hat{x})-y_i) \quad \text{formula (9)}$$

in the formula, $\hat{x}$ denotes the estimated state values of the microgrid in formula (8), $\dot{\hat{x}}$ denotes the change rate of the estimated state values in the microgrid; $f(\hat{x})$ denotes a connection matrix of the microgrid under the action of the estimated value; L denotes a Luenberger state observer matrix; $h_i(\hat{x})$ denotes an output function of the $i^{th}$ distributed generation corresponding to the estimated state value $\hat{x}$;

the step 30) further comprising: estimating the output voltages and output active and reactive powers of other distributed generations in real time according to local measured values of each distributed generation;

the step 40) further comprising: implementing requirements of accurate reactive power sharing and voltage restoration based on the local measured values of each distributed generation and an estimated measurement of other distributed generations, a decentralized secondary voltage control, yielding a secondary voltage compensation, transmitting secondary voltage compensation to a PWM (Pulse Width Modulation) module of a local controller; sending generated PWM pulse signal to a drive and power amplifier unit to trigger a power electronic switching transistor;

the reactive power sharing indicates that the output reactive power of each distributed generation is allocated according to the power capacity, and the implementation process is as shown in formula (10):

$$\begin{cases} \delta Q_i = k_{PQ}(Q_i^* - Q_i) + k_{iQ} \int (Q_i^* - Q_i)dt \\ Q_i^* = \frac{1/n_{Qi}}{\sum_{j=1}^{n} 1/n_{Qj}} \left( Q_i + \sum_{j=1, j\neq i}^{n} \hat{Q}_j \right) \end{cases} \quad \text{formula (10)}$$

in the formula, $\delta Q_i$ denotes a reactive power control signal for each calculation cycle; $k_{PQ}$ denotes a proportional coefficient in the reactive power proportional integral controller; $Q^*_i$ denotes the reactive power reference of the $i^{th}$ distributed generation; $k_{iQ}$ denotes an integral coefficient in the reactive power proportional integral controller; $n_{Qj}$ denotes a voltage droop coefficient of the $j^{th}$ distributed generation; $\hat{Q}_j$ denotes a reactive power estimation value of the $j^{th}$ distributed generation;

the voltage restoration indicates that the average value of the output voltages of the distributed generations through the microgrid is restored to the rated value, and the implementation process is as shown in formula (11):

$$\begin{cases} \delta V_i = k_{PE}(V^* - \overline{V_i}) + k_{iE} \int (V^* - \overline{V_i})dt \\ \overline{V_i} = \left( V_{odi} + \sum_{j=1, j\neq i}^{n} \hat{V}_{odj} \right) / n \end{cases} \quad \text{formula (11)}$$

in the formula, $\delta V_i$ denotes an average voltage restoration control signal for each calculation cycle; $k_{PE}$ denotes a proportional coefficient in the average voltage controller; $V^*$ denotes a voltage rated value; $\overline{V}_i$ denotes an average value of output voltages of all the distributed generations as estimated from the $i^{th}$ distributed generation; $k_{iE}$ denotes an integral coefficient in the average voltage controller; $\hat{V}_{odj}$ denotes an estimated value of the d-axis component of the output current of the $j^{th}$ distributed generation in the dq reference coordinate of the $j^{th}$ distributed generation;

by combining formulas (10) and (11), a secondary voltage control input for the $i^{th}$ distributed generation is as shown in formula (12):

$$u_i = \delta Q_i + \delta V_i \qquad \text{formula (12).}$$

2. The method according to claim 1, is characterized in that the common reference coordinate DQ refers to the dq reference coordinate of the $1^{st}$ distributed generation, and the state variables of the remaining distributed generations, buses and loads are converted to the common reference coordinate DQ through coordinate transformation.

3. The method according to claim 1, is characterized in that in step 10), the loads are impedance-type loads.

4. The method according to claim 1, is characterized in that in step 10), the frequency droop characteristic coefficient $m_{Pi}$ is determined according to an active power capacity of each distributed generation; and the voltage droop characteristic coefficient $n_{Qi}$ is determined according to a reactive power capacity of each distributed generation.

5. The method according to claim 1, is characterized in that in step 40), the decentralized voltage control of reactive power sharing and average voltage restoration is implemented based on the estimated value of each distributed generation on real-time states of other distributed generations, which does not rely on communication.

* * * * *